May 21, 1940. M. E. TOMAN Re. 21,461

APPARATUS FOR MOLDING

Original Filed May 27, 1935 3 Sheets-Sheet 1

Inventor.
Michael E. Toman,
By: Zabel, Carlson & Wells
Attorneys.

May 21, 1940. M. E. TOMAN Re. 21,461

APPARATUS FOR MOLDING

Original Filed May 27, 1935 3 Sheets-Sheet 2

Inventor:
Michael E. Toman,
By: Zahl, Carlson & Wells
Attorneys.

APPARATUS FOR MOLDING

Original Filed May 27, 1935 3 Sheets-Sheet 3

Inventor:
Michael E. Toman.
By: Zabel, Carlson & Wells
Attorneys

Reissued May 21, 1940

Re. 21,461

UNITED STATES PATENT OFFICE 21,461

APPARATUS FOR MOLDING

Michael E. Toman, Berwyn, Ill., assignor to Castings Patent Corporation, a corporation of Illinois Original No. 2,088,123, dated July 27, 1937, Serial No. 23,677, May 27, 1935. Application for reissue April 27, 1938, Serial No. 204,695

1 Claim. (Cl. 22—90)

The invention relates to apparatus for casting, and is particularly adapted to be practiced in connection with the production of metallic castings in molds formed from a plastic material such as calcined gypsum.

In one form of the invention, molds are produced from a mixture of calcined gypsum, asbestos pulp and water. When a mold is to be poured, the two parts thereof are assembled in the usual manner and a sheet or pad of yielding material such as asbestos fiber or rubber is placed against the top or bottom side of the mold, or sheets or pads of such material may be placed on both the upper and bottom sides of the mold. The mold with its sheets or pads is then inserted and clamped between two rigid plates under pressure. The yielding material, which is preferably resilient, yields or flexes, to conform to the mold surfaces engaged thereby despite faults which may be present in such engaged mold surfaces. This insures that the casting obtained from the mold will not have any appreciable fin at the parting line.

My principal object is to enable the pressure to be transmitted from the rigid press plates in substantially uniformly distributed fashion over the surfaces of the mold despite faults or irregularities on the outer mold surfaces so that localized stresses will not be set up in the fragile mold sections tending to cause fracture thereof or uneven pressure between the parting surfaces which might result in local failure. For example, when the mold material sets in the flask there is a meniscus formed about the mold edges by capillary attraction between the flask and the mold material. Such faults and other irregularities need not be removed before pouring when my apparatus is used.

Other objects and advantages will become apparent as the following detailed description progresses, reference being had to the accompanying drawings, wherein.

Figure 1:
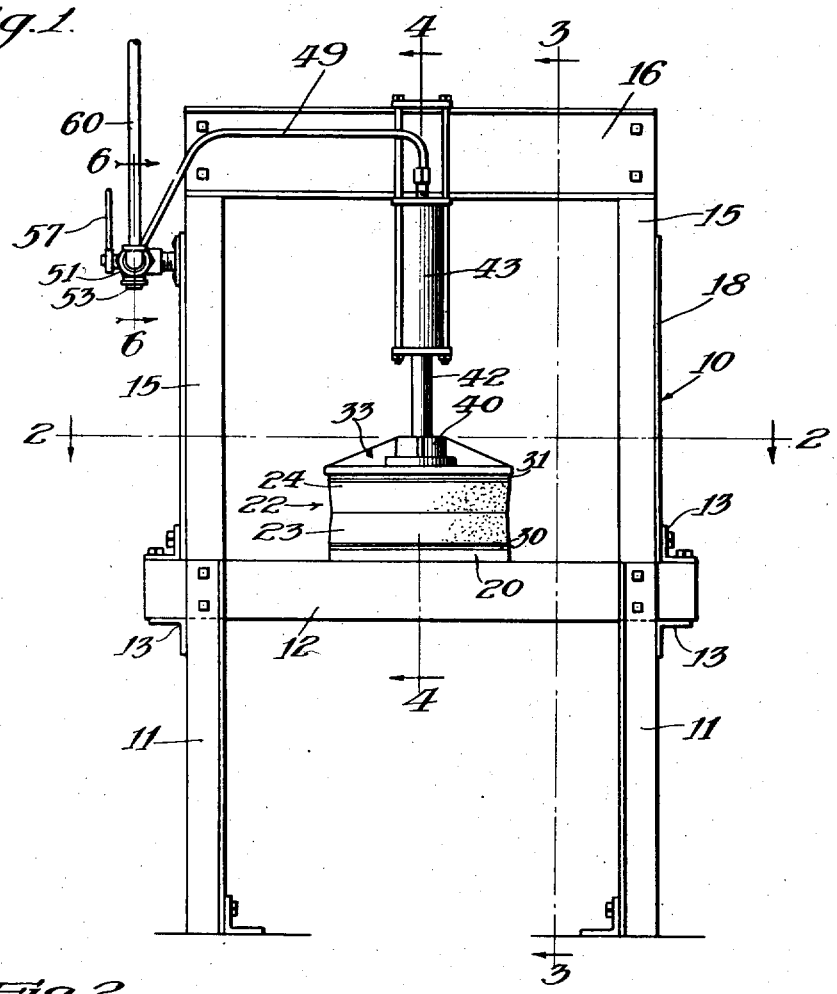
Fig. 1 is a front elevation of apparatus for holding a mold, under pressure, during the molding operation.
Figure 2:
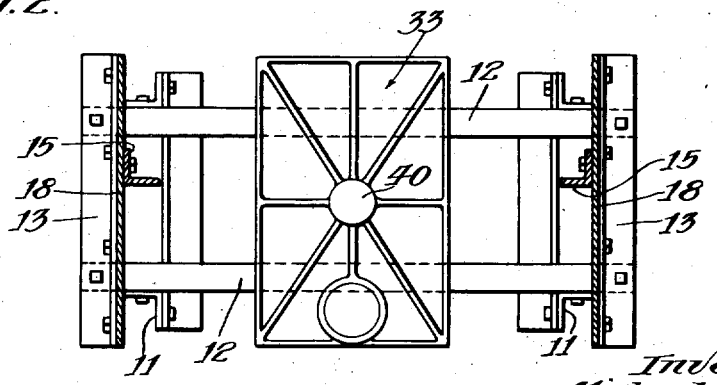
Fig. 2 is a section taken on line 2—2 of Fig. 1.
Figure 3:
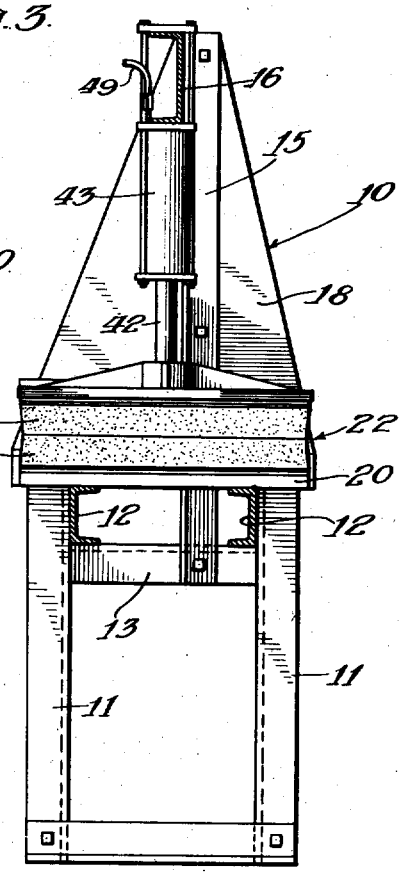
Fig. 3 is a section taken on line 3—3 of Fig. 1.

The apparatus shown in the accompanying drawings is particularly adapted to be employed in connection with molds formed from calcined gypsum, asbestos pulp and water. The pattern is usually formed in metal upon a metallic match plate, the flask being secured to the match plate and being provided with a cover plate. The materials from which the mold is to be formed are preferably placed therein and violently agitated after which the mold is permitted to set. The mold is then removed from the flask and is subjected to a drying operation. The dried mold is extremely porous and when fused metal is poured into it, the gases evolved during the pouring operation vent through the body of the mold. Of course, it is readily understood that the mold is made in two or more parts separately formed in suitable flasks which may be identical with each other in construction.

As indicated above, the mold members are removed from the flasks before they are assembled for the pouring operation. In fact, it has been found preferable to remove them from the flasks before the drying operation. When a mold is to be poured, the bottom member of it may be placed upon any suitable support and the top member is then placed upon the lower member and subjected to pressure so that the two parts of the mold will not separate during the pouring operation and allow a fin to be formed which must be removed subsequently. This, of course, increases the cost of producing castings in quantity as each individual casting must be handled during the operation of removing the fins.

Referring now to Figs. 1 to 6, inclusive, wherein improved apparatus embodying the invention is disclosed, the reference character 10 designates generally a frame which comprises legs 11 adapted to support the apparatus upon any suitable support such as a foundry floor. The upper ends of the legs are tied to each other by cross members 12 and 13 and extending upwardly from the cross members 13 are uprights 15 which are bolted at their upper ends to a cross member 16. The frame is strengthened by relatively large plates 18 which are bolted to some of the cross members 13 and to the uprights 15.

The cross members 12 carry a plate 20 adapted to support the molds during the pouring operation. In Figs. 1 to 6, inclusive, a mold is identified generally by the reference character 22 and comprises a bottom half or member 23 and a top member or half 24, the mold being formed with the usual mold cavity 25 and a pouring passage or sprue 26. In this instance, part of the mold cavity 25 is formed in the mold member 24 and part in the mold member 23. However, in some instances, the mold cavity is formed entirely in one of the mold members although the mold cavity is closed by the other mold member.

To insure uniform distribution of pressure over the upper and lower mold surfaces even though they may be of somewhat irregular contour, I employ pressure equalizing means in engagement with such surfaces. As one example of such means a pad 30 is disposed between the rigid plate 20 and the bottom surface of the mold 22, a similar pad 31 being inserted between the top surface of the mold 22 and a relatively heavy rigid plate 33 which is provided with an aperture 36 adapted to receive a sprue member 37 having a passage which communicates with the sprue 26. It will be noted that the plate 33 is provided with an annular shoulder 38 which engages a similar shoulder on the sprue 37 and holds the sprue 37 in contact with the top surface of the mold member 24.

Figure 6:
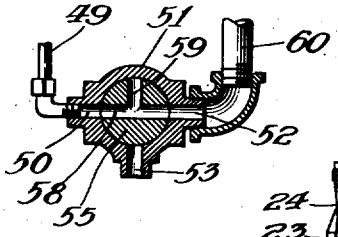
Fig. 6 is an enlarged fragmentary section taken on line 6—6 of Fig. 1.
Figure 4:
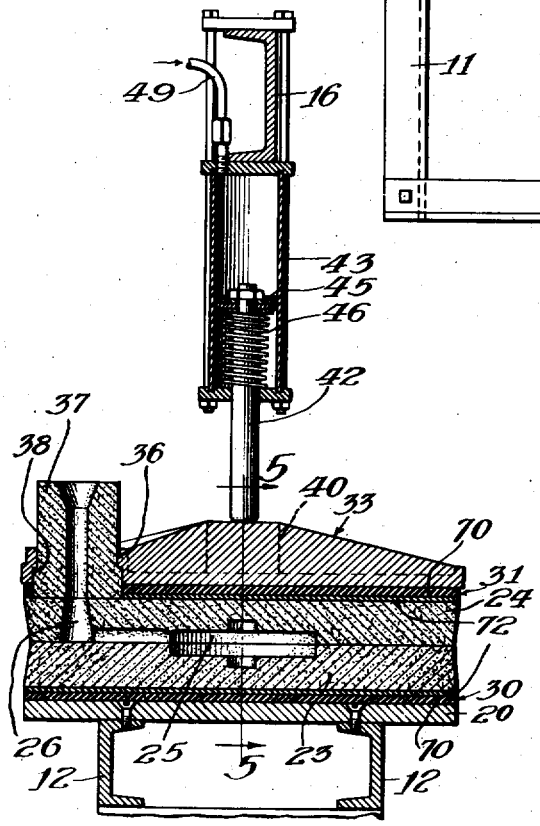
Fig. 4 is an enlarged fragmentary section taken on line 4—4 of Fig. 1.
Figure 5:
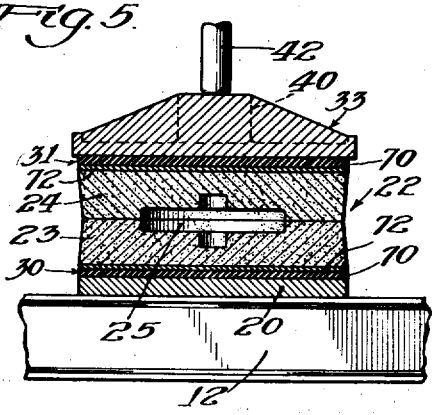
Fig. 5 is a section taken on line 5—5 of Fig. 4.

Abutting against the top surface of a boss 40 formed integral with the plate 33 is a plunger 42 which projects from the bottom end of a vertically disposed cylinder 43 depending from and secured to the cross member 16. The upper end of the plunger 42 is secured to a piston 45 slidably journaled in the cylinder and urged upwardly by a compression spring 46. The upper end of the cylinder 43 communicates through a tube 49 with a port 50 in a valve casing 51 provided with additional ports 52 and 53, the port 53 being an exhaust port. A valve plug 55 (Figs. 1 and 6) rotatably journaled in the valve casing 51 and adapted to be displaced angularly by a lever 57 is provided with a passage 58 extending diametrically thereof and adapted to connect the ports 50 and 52 to each other. The valve plug 55 has another passage 59 communicating with the passage 58. The port 52 is connected to any suitable supply (not shown) of fluid under pressure by a pipe 60. When the valve plug is in the position wherein it is shown in Fig. 6, the fluid, under pressure, will flow from the pipe 60, through the port 52, the passage 58, the port 50 and thence through the tube 49 to the cylinder 43 to force the piston 45 and the plunger 42 downwardly against the action of the spring 46. Excellent results have been obtained when the apparatus is adjusted so that the mold is subjected to a pressure ranging from 1.5 pounds per square inch to a pressure of 2.5 pounds per square inch. Of course, the mold is subjected to this pressure during the pouring operation and during the initial cooling operation.

After a mold has been poured, the valve plug 55 is displaced in a counter-clockwise direction (Fig. 6) so that the outer end of the passage 59 communicates with the port 50 and one end of the passage 58 communicates with the exhaust port 53. The valve plug 55 then shuts off the supply (not shown) of fluid under pressure and permits the cylinder 43 to exhaust through the tube 49, the port 50, the passages 59 and 58, and thence through the exhaust port 53. This permits the spring 46 to elongate and lift the plunger 42 from the plate 33 so that it may be removed.

The pads 30 and 31 may be formed of various yielding substances or yielding members. In that form of the invention illustrated in Figs. 1 to 6, inclusive, the pads 30 and 31 are formed of relatively thick sheets 70 of sponge rubber, each sheet 70 being faced on one side by a sheet of asbestos 72, the asbestos sheets 72 abutting against the adjacent surfaces of the mold 22 and protecting the rubber sheets 70 from the heat of the fused metal introduced into the mold cavity.

In practice it has been found that the yielding pads 30 and 31 will function in such manner that if the mold members set and dry so that the backs of the mold members 23 and 24 have a slight meniscus or other irregularities so that such outer surfaces are not perfectly plane throughout, the pads 30 will yield to lie in substantially contiguous contact with such surfaces. Of course, when the yielding members are formed of sponge or relatively soft rubber, they yield a relatively large amount when they are subjected to the pressure set forth above. The substantial uniformity of pressure over the surfaces of the mold parts will eliminate excessive localized stresses which would tend to crack or fracture the fragile molds or to cause a failure of portions of the parting surfaces having small areas of contact.

The operation of the apparatus illustrated in Figs. 1 to 6, inclusive, is substantially as follows: After the mold 22 has been formed in the manner described, the two parts 23 and 24 thereof are assembled with the pads 30 and 31 and inserted between the rigid plates 20 and 33, the plate 33 being lifted from a suitable bench, or the equivalent, and placed upon the pad 31 with the sprue member 37 in place. The valve plug 55 is then adjusted so that the fluid, under pressure, exerts its force upon the plate 33 and clamps the mold members 23 and 24 and the pads 30 and 31 between it and the plate 20. The fused metal is then poured into the mold in the usual manner and after it has set and cooled a sufficient length of time, the valve plug 55 is displaced angularly so that the fluid, under pressure, will be exhausted from the cylinder 43, whereupon the spring 46 will elongate and move the plunger 42 upwardly. The plate 33 may then be removed from the mold and the mold may be placed upon any convenient support until it is to be broken to remove the casting therefrom.

It has been found that when molds are produced by practicing the method described above, they are substantially free from fins at the parting line or lines.

Figure 7:
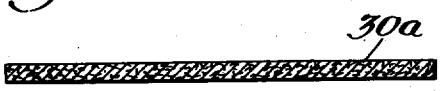
Fig. 7 is a longitudinal section taken through a sheet or a pad of yielding material, which sheet or pad embodies a modified form of the invention.

In Fig. 7, a pad 30*a* formed of asbestos fiber is shown. This pad may be employed in place of either of the pads 30 or 31 described above. The pad 30*a* is formed from braided asbestos fiber.

Figure 8:
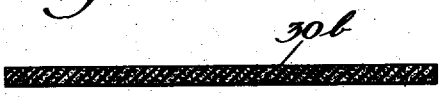
Fig. 8 is a longitudinal section taken through a sheet or pad of yielding material, which sheet or pad embodies another form of the invention.

In Fig. 8, a pad 30*b* is shown which may be employed in place of the pads 30 and 31. The pad 30*b* is formed from rubber. It is readily understood that the pads 30*a* and 30*b* may be superimposed upon each other and employed in place of the pads 30 and 31 described above.

Figure 9:
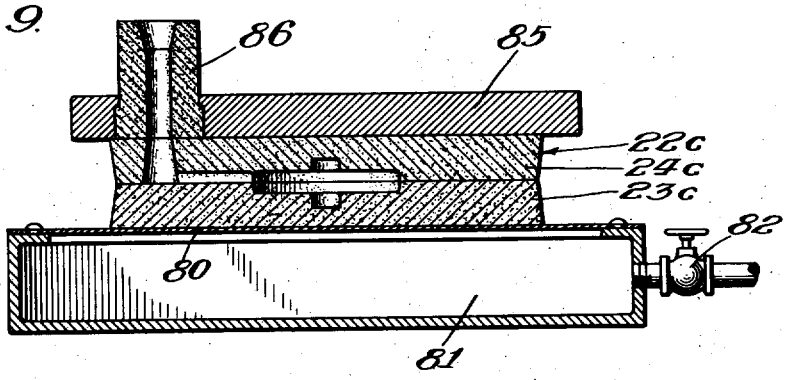
Fig. 9 is a fragmentary central section taken through apparatus embodying another form of the invention.

In Fig. 9, a mold 22*c* identical with the mold 22 is shown. The mold 22*c* comprises mold members 23*c* and 24*c* formed of calcined gypsum, abestos pulp and water. In this instance as in the instance described above, substantially all the free water and a relatively large part of the water in chemical combination has been removed from the mold members 23c and 24c during the drying operation so that they are extremely porous. The bottom mold 23c rests upon a relatively thin sheet metal plate 80 which forms a closure for a chamber 81 connected to any suitable source (not shown) of fluid under pressure through a valve 82. In some instances, the chamber 81 will be filled with compressed air to a suitable pressure and in other instances, the chamber 81 will be filled with water. However, it is contemplated that in both instances the sheet metal member 80 will flex and function in the same manner and for the same purpose as the pads 30 and 31 described above. The upper mold member 24c has a weight 85 resting upon it, which weight is apertured to hold the sprue member 86 having the same function as the sprue member 37 described above.

Figure 10:
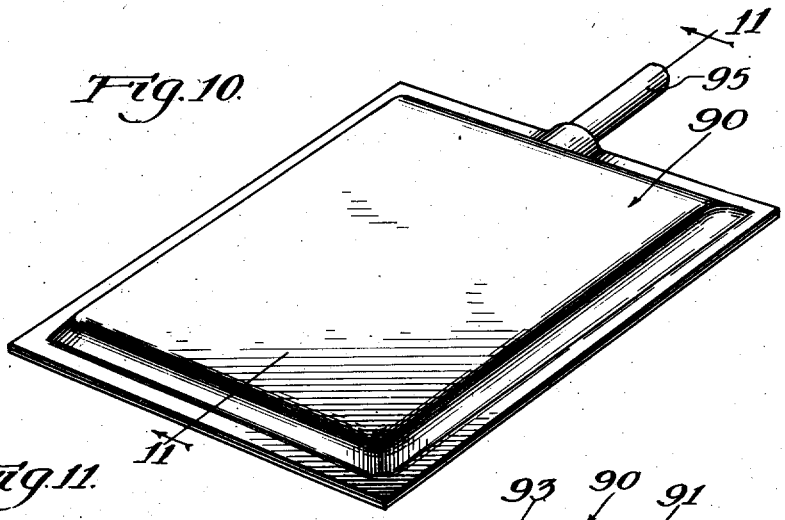
Fig. 10 is a perspective view of a hollow sheet metal pad which embodies still another form of the invention.
Figure 11:
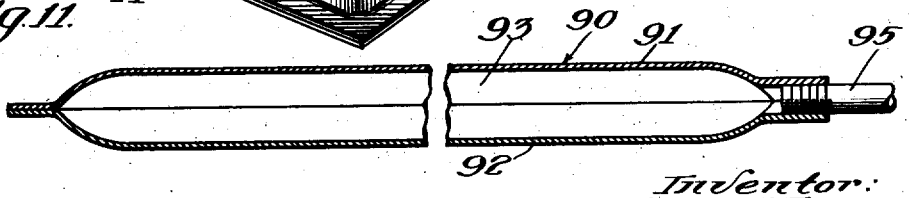
Fig. 11 is a section taken on line 11—11 of Fig. 10.

In Figs. 10 and 11, another embodiment of the invention is illustrated. Thus, a hollow metallic pad is designated generally by the reference character 90 and comprises top and bottom walls 91 and 92, respectively, which have their marginal portions welded to each other. The walls 91 and 92 are formed from relatively thin sheet metal and form a chamber 93 into which compressed air or water may be introduced through a pipe 95. It is contemplated that the pad 90 may be employed in place of the pads 30 and 31 and that it will yield and function in substantially the same manner as the pads 30 and 31.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as permissible, in view of the prior art.

I claim as my invention.

Apparatus for clamping together complementary mold members for the pouring operation, comprising pressure creating means, an open-topped, rigid metal receptacle having the bottom thereof engageable by said pressure creating means, a thin, flexible metal sheet closing the top of said receptacle, engageable directly with a surface of a mold member and deformable to conform substantially to the irregularities in such mold surface, and fluid filling such closed receptacle to afford internal support for said thin, flexible metal sheet, and to press it against the irregular mold surface with substantially uniform pressure over the entire area of said sheet in transmitting to the mold the pressure exerted on said pressure member by said pressure creating means.

MICHAEL E. TOMAN.